(12) United States Patent
Schmidt et al.

(10) Patent No.: US 12,715,405 B2
(45) Date of Patent: Aug. 25, 2026

(54) BRAKE SYSTEM FOR A VEHICLE AND METHOD FOR OPERATING A BRAKE SYSTEM

(71) Applicant: ZF Active Safety GmbH, Koblenz (DE)

(72) Inventors: Frank Schmidt, Brodenbach (DE); Fabian Querbach, Lonnig (DE); Frank Einig, Ochtendung (DE); Peter Goergen, Zell (DE); Thomas Puetz, Naunheim (DE); Frank Heller, Boppard (DE); Thomas Wald, Hollnich (DE); Joachim Oster, Ernst (DE); Johanna Mengelkoch, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 443 days.

(21) Appl. No.: 17/735,175

(22) Filed: May 3, 2022

(65) Prior Publication Data

US 2022/0363229 A1 Nov. 17, 2022

(30) Foreign Application Priority Data

May 12, 2021 (DE) ........................ 102021112434.4

(51) Int. Cl.
*B60T 13/74* (2006.01)
*B60T 8/18* (2006.01)
(Continued)

(52) U.S. Cl.
CPC .......... *B60T 8/1881* (2013.01); *B60T 8/4077* (2013.01); *B60T 8/4081* (2013.01); *B60T 13/686* (2013.01);
(Continued)

(58) Field of Classification Search
CPC .... B60T 13/686; B60T 8/1881; B60T 8/4077; B60T 8/4081; B60T 2270/402; B60T 2270/404
See application file for complete search history.

(56) References Cited

U.S. PATENT DOCUMENTS

2011/0254361 A1* 10/2011 Scharmann ............ B60T 8/405 303/10
2014/0152085 A1* 6/2014 Biller ..................... B60T 13/58 303/14
(Continued)

FOREIGN PATENT DOCUMENTS

DE 19648454 A1 5/1997
DE 19581271 C2 9/2002

*Primary Examiner* — Bradley T King
(74) *Attorney, Agent, or Firm* — Kristin L. Murphy

(57) ABSTRACT

A brake system for a vehicle is disclosed herein, which is constructed for selective pressurisation and pressure relief of at least two pressure connections for brake actuators. The brake system comprises an electrofluidic pressure generation unit, a main cylinder unit and an electrofluidic pressure increase unit, which is fluidly coupled at the input side to the electrofluidic pressure generation unit and/or the main cylinder unit in such a manner that exclusively a volume flow of pressure fluid which is pressurised by the electrofluidic pressure generation unit and/or the main cylinder unit can be acted on with a supplementary pressure by the pressure increase unit. At the output side, the pressure increase unit is connected in fluid terms to one of the pressure connections. In addition, a method for operating such a brake system is set out.

14 Claims, 3 Drawing Sheets

(51) Int. Cl.
*B60T 8/40* (2006.01)
*B60T 13/68* (2006.01)

(52) U.S. Cl.
CPC ... *B60T 2270/402* (2013.01); *B60T 2270/404* (2013.01)

(56) References Cited

U.S. PATENT DOCUMENTS

| | | | | |
|---|---|---|---|---|
| 2014/0203626 | A1* | 7/2014 | Biller | B60T 7/02 303/14 |
| 2016/0152223 | A1* | 6/2016 | Bauer | B60T 7/042 303/14 |
| 2017/0129468 | A1* | 5/2017 | Besier | B60T 8/4086 |
| 2017/0129469 | A1* | 5/2017 | Besier | B60T 13/142 |
| 2017/0232948 | A1* | 8/2017 | Leiber | B60T 13/146 303/11 |
| 2017/0274884 | A1* | 9/2017 | Besier | B60T 13/686 |
| 2017/0282877 | A1* | 10/2017 | Besier | B60T 8/885 |
| 2017/0341630 | A1* | 11/2017 | Zipfel | B60T 8/321 |
| 2017/0361825 | A1* | 12/2017 | Drumm | B60T 8/4081 |
| 2019/0071059 | A1* | 3/2019 | Besier | B60T 8/4081 |
| 2020/0139948 | A1* | 5/2020 | Leiber | B60T 13/145 |
| 2020/0139949 | A1* | 5/2020 | Dolmaya | B60T 8/4081 |
| 2020/0361439 | A1* | 11/2020 | Neu | B60T 13/146 |
| 2022/0126806 | A1* | 4/2022 | Leiber | F15B 13/06 |
| 2022/0250600 | A1* | 8/2022 | Leiber | B60T 13/142 |
| 2024/0001899 | A1* | 1/2024 | Stanojkovski | B60T 13/686 |

* cited by examiner

BRAKE SYSTEM FOR A VEHICLE AND METHOD FOR OPERATING A BRAKE SYSTEM

CROSS-REFERENCE TO RELATED APPLICATION

This application claims priority to German Priority Application No. 102021112434.4, filed May 12, 2021, the disclosure of which is incorporated herein by reference in its entirety.

TECHNICAL FIELD

The disclosure relates to a brake system for a vehicle, wherein the brake system is constructed for selective pressurisation and pressure relief of at least two pressure connections for brake actuators and each of the pressure connections can be coupled to an associated brake actuator of a wheel of the vehicle. The brake system comprises an electrofluidic pressure generation unit which is fluidly coupled to a pressure fluid reservoir so that a volume flow of pressure fluid from a pressure fluid reservoir can be selectively pressurised and provided at the pressure connections. Furthermore, the brake system comprises a main cylinder unit which comprises a fluidic brake main cylinder which can be activated by a brake pedal, wherein the main cylinder unit is fluidly connected to the pressure fluid reservoir so that a volume flow of pressure fluid from the pressure fluid reservoir can be selectively pressurised and provided at the pressure connections. The disclosure further relates to a method for operating such a brake system.

BACKGROUND

Brake systems and methods for the operation thereof are known from the prior art. Generally during normal operation, that is to say, when there is no defect on the brake system, the brake pedal which is coupled to the main cylinder unit is used only to inquire about a braking request of a driver. Actual pressurisation and pressure relief of pressure connections is carried out by an electrofluidic pressure generation unit. In this context, the main cylinder module cooperates with a simulator unit which is known per se and which is constructed to produce a restoring force on the brake pedal. The main cylinder module is thus not fluidly coupled to the pressure connections during normal operation. Such an operating mode is also referred to as brake-by-wire operation.

In the event of a defect on the electrofluidic pressure generation unit, however, the pressure connections can also be pressurised and relieved of pressure exclusively by the main cylinder unit. Therefore, a vehicle which is equipped with such a brake system can also be braked in a reliable manner when there is a defect on the electrofluidic pressure generation unit.

Furthermore, vehicles of different sizes and different weights are known. These vehicles have to be equipped with brake systems which can provide a brake power which is in particular suitable for the respective vehicle weight in the form of a brake pressure and/or a volume flow of pressure fluid to the pressure connections. Known brake systems are therefore always constructed for a specific vehicle weight category. A brake system is, for example, specifically constructed for a compact car with a permissible overall weight of 2 t or for a light truck with a permissible overall weight of 7.5 t.

Based on these exemplary vehicles, it can be seen immediately that the brake system which is suitable for the light truck would be oversized for the compact car. Conversely, the brake system of the compact car would not be sufficiently powerful to be used in the light truck.

SUMMARY

What is needed is a brake system which can be used in vehicles with significantly differing weights.

A brake system of the type mentioned above is disclosed which additionally has an electrofluidic pressure increase unit which is fluidly coupled at an input side to an electrofluidic pressure generation unit and/or a main cylinder unit in such a manner that exclusively a volume flow of pressure fluid which is pressurised by the electrofluidic pressure generation unit and/or the main cylinder unit can be acted on with a supplementary pressure by a pressure increase unit. At an output side, the electrofluidic pressure increase unit is connected in fluid terms to one of the pressure connections. In this context, the pressure fluid should generally be considered to be incompressible. Explanations which refer to a volume flow of pressure fluid consequently also apply in the same way to the corresponding mass flow. In other words, in this context the volume flow and the mass flow of pressure fluid are interchangeable. In the brake system according to the disclosure, the electrofluidic pressure generation unit and the main cylinder unit consequently form a base module. In this instance, the pressure generation unit and the main cylinder unit may be configured to place the pressure fluid under a specific maximum pressure and to provide a degree of maximum volume flow of pressure fluid. The pressure increase unit receives the volume flow of pressure fluid provided by the main cylinder unit and/or the pressure generation unit and applies a supplementary pressure to it. The pressure provided at the pressure connection is consequently composed of a first portion, which is provided by the electrofluidic pressure generation unit and/or the main cylinder unit, and a second portion, which is provided by the pressure increase unit. The pressure increase unit is consequently not connected separately to the pressure fluid reservoir. Instead, a feed circuit of the pressure increase unit is connected to the pressure fluid reservoir only by the pressure generation unit and/or the main cylinder unit. Fluid paths for pressure reduction, that is to say, return paths, may in contrast lead directly from the pressure increase unit into a pressure fluid reservoir of the brake system. Such a brake system can be adapted in a simple manner to a use in vehicles of different weights. In this instance, the base module is used regardless of the vehicle weight. Only the pressure increase unit has to be selected in a weight-specific manner. The pressure increase unit can therefore be provided as a supplementary module. Scale effects are produced with respect to the base module which comprises the main cylinder unit and the pressure generation unit with the result that the brake system can be produced on the whole in a cost-effective manner. As already explained in the introduction, as a result of the base module a redundant arrangement of the main cylinder unit and the electrofluidic pressure generation unit is already produced so that the brake system has a high level of reliability during operation.

Since the pressure increase unit increases only a pressure level which is provided by the pressure generation unit and/or the main cylinder unit, the pressure increase unit can also be referred to as a booster unit or a pressure supplement module. As already explained, it can be structurally configured as a supplementary module.

In one exemplary arrangement, the pressure increase unit comprises an electromotively driven pressure generator. In one exemplary arrangement, the electromotively driven pressure generator is a single-piston pump or a multi-piston pump. Such pressure generators are constructed in a structurally simple manner and have only a comparatively small spatial requirement. In addition, such pressure generators operate with a high level of reliability. Furthermore, the pressure increase unit can be adapted in a simple manner to different vehicle categories by different pressure generators being used. In this context, a multi-piston pump has with respect to a single-piston pump the advantage that it can convey a higher volume flow of pressure fluid in accordance with the number of pistons.

The pressure increase unit may also have a bypass fluid path which circumvents the pressure generator, wherein a control valve which is pressure-controlled at the output side is arranged in the bypass fluid path. In this context, a pressure control at the output side is intended to be understood to mean that the pressure control originates from one of the pressure connections of the brake system which is associated with the pressure increase unit. The bypass fluid path serves, on the one hand, to also be able to provide a pressure at the pressure connection which is associated with the pressure increase unit when the pressure generator is not used. This may be the case when a pressure provided by the pressure generation unit and/or the main cylinder unit is sufficient for an existing situation. Furthermore, in this manner, the brake system also remains operational when the pressure generator has a defect. Furthermore, the bypass fluid path serves to precisely control a pressure level which is provided by the pressure generator. In this context, the bypass fluid path is flowed through in an opposing direction, that is to say, from an output side of the pressure generator to an input side. Using the control valve, a suitable pressure drop can be adjusted at this location. The pressure control in this instance results in the control valve being moved in the direction of the open position thereof in the event of a pressure peak. Consequently, any undesirable pressure peaks which may occur are kept away from the pressure connections of the brake system. It is understood in this instance that, by operation of a corresponding control of the pressure generator, a desired pressure level can of course also be adjusted at the output thereof. However, it has been found that, by cooperation with the control valve, which is arranged in the bypass fluid path, a particularly precise control, that is to say, a virtually proportional control, of a pressure level at the pressure connection is possible, which control can in addition react in a rapid manner to changed pressure requirements.

In this instance, the control valve may be pretensioned into an open position, wherein the pretensioning acts in the same direction as the pressure control. In a powerless state, the control valve is thus opened. Consequently, the brake system is generally operational even when a power supply of the pressure increase unit is interrupted. Furthermore, no energy is thus consumed by the pressure increase unit if it is sufficient to provide at the associated pressure connection a pressure level which is provided by the pressure generation unit and/or the main cylinder unit. The brake system can thus be operated in an energy-efficient manner.

Advantageously, the control valve can be electrically activated in the opposite direction to the pressure control and/or the pretensioning. In other words, the control valve can be actively moved into a completely or partially closed position. Consequently, a supplementary pressure which can be provided by the pressure increase unit can be actively adjusted.

Furthermore, the pressure increase unit may have a pressure store for pressure fluid. This has a plurality of effects. On the one hand, using the pressure generator of the pressure increase unit a supplementary pressure can thereby be provided comparatively quickly. In simple terms, pressure fluid is always applied at the input side to the pressure generator so that it can be placed substantially immediately under a supplementary pressure. The brake system is thereby also extremely reactive with respect to the supplementary pressure. Furthermore, a supplementary volume flow of pressure fluid can be provided at least briefly. A significant aspect in this regard is a volume of the pressure store. Furthermore, using the pressure store, undesirable pressure fluctuations, and in one exemplary arrangement, pressure pulses within the pressure increase unit, can be damped.

According to one exemplary arrangement, the pressure store is arranged in a fluid path which surrounds the pressure generator or is connected to a fluid path which surrounds the pressure generator by a side line. In the first instance mentioned, the pressure generator and the pressure store are thus connected in series. In the second instance mentioned, the side line opens in the fluid path which comprises the pressure generator. In both variants, there is consequently in each operating situation a sufficient quantity of pressure fluid available at the pressure generator so that a supplementary pressure and/or a supplementary volume flow can be provided within the shortest possible period of time.

In one exemplary arrangement, the pressure increase unit may also have a pressure store bypass path which circumvents the pressure store. In this instance, the pressure store bypass path is also a fluid path. It may particularly be used if no supplementary pressure is intended to be or can be provided by the pressure increase unit. The last case mentioned is, for example, the case when the pressure increase unit has a defect.

According to one exemplary arrangement, the main cylinder unit and the electrofluidic pressure generation unit are configured as a mechanically coherent unit. For example, the main cylinder unit and the electrofluidic pressure generation unit are arranged in a common housing or a coherent block through which fluid channels extend. The block through which fluid channels extend may be constructed in one piece or several pieces. However, it always forms a coherent unit. The brake system is consequently constructed in a compact manner. Furthermore, as a result of this configuration, connection lines are dispensed with, which facilitates the assembly of the brake system. With such a configuration, only comparatively short fluid lines are also necessary. This results in an advantageous response behaviour of the brake system. The coherent unit may in this instance, as already explained above, be considered to be a base module. The pressure increase unit is not a component of this coherent unit and is consequently connected to this base module as a separate supplementary module. A modular construction of the brake system is produced, making it simple to adapt the brake system to vehicles with a different weight.

The main cylinder unit and the electrofluidic pressure generation unit can act selectively on the pressure connections via at least one selection valve, wherein the selection valve is pretensioned into a switching position in which the main cylinder unit is fluidly coupled to the pressure connections. This means that the selection valve has to be actively moved into a switching position in which the electrofluidic pressure generation unit is exclusively coupled to the pressure connections. In this context, the brake-by-wire operation which has been explained above can be produced, wherein the main cylinder unit serves only to inquire about a drivers request and the actual braking is carried out by the electrofluidic pressure generation unit. At the same time, however, it is ensured that in particular in the event of an energy supply failure, the pressure connections are pressurised by the main cylinder unit and can be relieved of pressure. The brake system is consequently extremely reliable during operation.

In one exemplary arrangement, the pressure increase unit is coupled in fluid terms via the selection valve to the pressure generation unit and/or the main cylinder unit. The pressure increase unit can consequently cooperate with the pressure generation unit and/or the main cylinder unit depending on the operating situation. An associated construction is simple. Furthermore, the functional redundancy of the pressure generation unit and main cylinder unit is retained in this case.

In one exemplary arrangement, a pressure modulation unit is positioned in fluid terms between, on the one hand, the pressure increase unit and, on the other hand, the pressure generation unit and/or the main cylinder unit. In this context, a pressure modulation unit is intended to be understood to be a unit having a plurality of valves which are connected in such a manner that a pressure can selectively be provided or removed at individual pressure connections which are associated with individual brake actuators. Such a functionality is particularly used as a component of the anti-lock braking system. With a brake system according to the disclosure, the functionalities of the anti-lock braking system are consequently also available when the pressure increase unit is used. In the event that the pressure generation unit and the main cylinder unit are arranged in a coherent structural unit, the pressure modulation unit is also arranged in this coherent structural unit. In other words, the functions of the anti-lock braking system are integrated in the base module.

According to one exemplary arrangement, there are provided two or more electrofluidic pressure increase units which are connected at the output side in fluid terms in each case to one of the pressure connections. Two or more pressure connections may thus be provided with an electrofluidic pressure increase unit. In an extreme case, each pressure connection is coupled to an electrofluidic pressure increase unit. The pressure increase units always act in this instance on a single, fixedly associated pressure connection.

A method for operating a brake system is also disclosed.

In one exemplary arrangement, during normal operation of the brake system in a low-load mode, a volume flow of pressure fluid from the pressure fluid reservoir is pressurised exclusively by the electrofluidic pressure generation unit. The term “normal operation” is in this instance intended to be understood to be an operating situation in which no defects or functional interruptions are present in the brake system. In this context, the main cylinder unit, as explained above, serves only to inquire about a driver’s request. The pressure increase unit is not used in the low-load mode since the pressure level required and a required volume flow of pressure fluid can be provided exclusively by the electrofluidic pressure generation unit. In a vehicle in which a brake system according to the disclosure is installed, this operating mode is used, for example, for a light braking operation.

Alternatively or additionally, during normal operation of the brake system, in a high-load mode, a volume flow of pressure fluid from the pressure fluid reservoir is brought by the electrofluidic pressure generation unit to a first pressure level and is brought by the electrofluidic pressure increase unit from the first pressure level to a second, higher pressure level. Normal operation is again intended to be understood to be an operating situation in which nether defects nor malfunctions are present in the brake system. However, the required pressure and/or the required volume flow of pressure fluid is now provided by cooperation of the electrofluidic pressure generation unit and the electrofluidic pressure increase unit. In a vehicle in which a brake system according to the disclosure is installed, this operating mode is, for example, used for powerful braking.

Alternatively or additionally, in a first malfunction mode of the brake system in a low-load mode, a volume flow of pressure fluid from the pressure fluid reservoir is pressurised exclusively by the main cylinder unit and/or in the first malfunction mode of the brake system in a high-load mode, a volume flow of pressure fluid from the pressure fluid reservoir is brought by the main cylinder unit to a first pressure level and is brought by the electrofluidic pressure increase unit from the first pressure level to a second, higher pressure level. In this context, a first malfunction mode of the brake system is intended to be understood to be an operating situation in which the electrofluidic pressure generation unit has a defect and is therefore non-functional. The first malfunction mode can therefore also be referred to as a pressure generation unit malfunction mode. In this context, the redundancy between the electrofluidic pressure generation unit and the main cylinder unit takes effect. In the event that a sufficient pressure and a sufficient volume flow of pressure fluid can be provided by the main cylinder unit alone, the pressure increase unit is not required. Otherwise, the main cylinder unit and the pressure increase cooperate.

Alternatively or additionally, in a second malfunction mode of the brake system, a volume flow of pressure fluid from the pressure fluid reservoir is pressurised exclusively by the electrofluidic pressure increase unit. In the second malfunction mode, the electrofluidic pressure generation unit also has a defect and consequently cannot be used. In contrast to the first malfunction mode, however, the main cylinder unit is also not available to produce a pressure. This may be a result of the fact that the vehicle in which the brake system is installed is used in an autonomous or partially autonomous operating mode, in which there is no provision for an intervention of the driver for braking. The second malfunction mode can therefore also be referred to as an autonomous pressure generation unit malfunction mode. Of course, the second malfunction mode can also be used when both the main cylinder unit and the pressure generation unit have a defect and consequently both the main cylinder unit and the pressure generation unit are non-functional.

In a third malfunction mode of the brake system, alternatively or additionally a volume flow of pressure fluid from the pressure fluid reservoir is brought by the main cylinder unit to a first pressure level and is brought by the electrofluidic pressure increase unit from the first pressure level to a second, higher pressure level. The third malfunction mode thus corresponds to the first malfunction mode with the difference that there is no longer any distinction between low-load mode and high-load mode. This is a result of the fact that for the third malfunction mode it is assumed that by the main cylinder unit there can be provided only such a low pressure level which is not sufficient alone to carry out a braking operation. The pressure level which can be provided is thus insufficient for an activation of a brake actuator which is connected to an associated pressure connection, The main cylinder unit and the pressure increase unit thus cooperate for each braking operation. The third malfunction mode can therefore also be referred to as pressure generation unit malfunction and main cylinder unit malfunction mode.

Alternatively or additionally, in a fourth malfunction mode of the brake system, a volume flow of pressure fluid from the pressure fluid reservoir is brought by the electrofluidic pressure generation unit to a first pressure level and is brought by the electrofluidic pressure increase unit from the first pressure level to a second, higher pressure level. In the fourth malfunction mode, no distinction is thus also made between a low-load mode and a high-load mode. In a similar manner to the third malfunction mode, it is now assumed that by the pressure generation unit there can be provided only such a low pressure level which is not sufficient alone to carry out a braking operation. The pressure level which can be provided is thus insufficient for activation of a brake actuator which is connected to an associated pressure connection. For each braking operation, the pressure generation unit and the pressure increase unit thus cooperate. The main cylinder unit is in this instance not available, for example, since the vehicle in which the brake system is used is operated in an autonomous or partially autonomous mode, in which a driver intervention for braking is not provided. The fourth malfunction mode can therefore also be referred to as an autonomous pressure generation unit malfunction mode. Of course, this operating mode can also be used when the main cylinder unit has completely failed.

In this instance, a first, second, third and fourth malfunction mode is defined. However, it is self-evident that the numbering of the malfunction modes is used only for simple identification and in no way implies a number of malfunction modes provided. It is thus also possible for the method for operating a brake system according to the disclosure to comprise only a third or only a fourth malfunction mode.

In this context, the brake system can be operated in a low-load mode when a pressure which is intended to be provided by the brake system is below a limit pressure. The brake system can be operated in a high-load mode when the pressure which is intended to be provided corresponds to or exceeds the limit pressure. In particular, the limit pressure corresponds to a maximum pressure which can be provided by the electrofluidic pressure generation unit and/or the main cylinder unit. The pressure increase unit is only used when sufficient pressure cannot be provided by the pressure generation unit and/or the main cylinder unit. Alternatively, the limit pressure may also correspond to a pressure which is below the maximum pressure which can be provided by the electrofluidic pressure generation unit. The pressure increase unit is consequently also used in situations in which the power limit of the electrofluidic pressure generation unit has not yet been reached. To some degree, the pressure generation unit is thus protected since it has to produce pressures which are close to the power limit thereof less often. A comparatively long service-life of the brake system can thus be achieved.

The method according to the disclosure can also be used to compensate for a so-called brake fading. The term "fading" in this instance refers to an undesirable decrease of the braking action as a result of heating of the pressure fluid. In order to compensate for this, the pressure increase unit may, for example, be controlled in accordance with a temperature value of the pressure fluid in order to compensate for this effect. The brake system according to the disclosure can consequently also be operated in a fading mode.

BRIEF DESCRIPTION OF DRAWINGS

The disclosure is explained below with reference to various exemplary arrangements which are illustrated in the appended Figures, in which.

DETAILED DESCRIPTION

Figure 1:
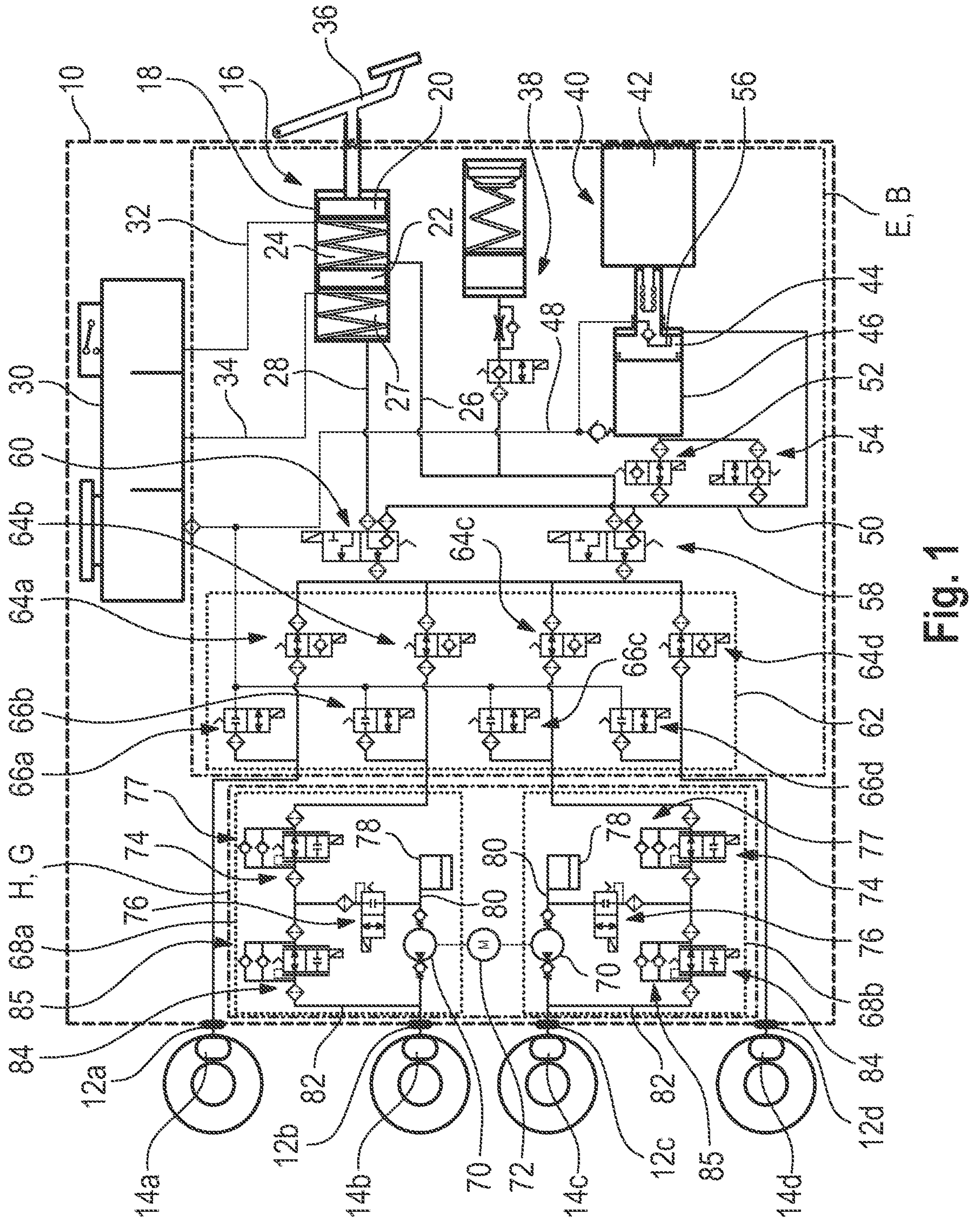
FIG. 1 shows a brake system according to the disclosure according to a first exemplary arrangement which can be operated using a method according to the disclosure.

FIG. 1 shows a brake system 10 according to a first exemplary arrangement.

In this instance, all the valves of the brake system 10 are shown in their non-activated position.

In the exemplary arrangement illustrated, the brake system 10 is constructed to be used in a vehicle having four wheels.

Therefore, the brake system 10 has a total of four pressure connections 12*a*, 12*b*, 12*c*, 12*d* for brake actuators. They can selectively be pressurised and be relieved of pressure by the brake system 10.

In the exemplary arrangement illustrated, there is connected to the pressure connection 12*a* a brake actuator 14*a* which is associated with a rear left wheel of the vehicle.

There is connected to the pressure connection 12*b* a brake actuator 14*b* which is associated with a front right wheel.

The pressure connection 12*c* is fluidly connected to a brake actuator 14*c* which is associated with a front left wheel and the pressure connection 12*d* is connected to a brake actuator 14*d* which is associated with a rear right wheel.

All four wheels of the vehicle can thus be braked by the brake system.

For pressure supply and pressure relief of the pressure connections 12*a*, 12*b*, 12*c*, 12*d*, the brake system 10 has a main cylinder unit 16. This comprises a fluidic brake main cylinder 18 which is provided with a first piston 20 and a second piston 22.

In this instance, between the first piston 20 and the second piston 22 there is provided a first pressure chamber 24 via which a first pressure line 26 can be acted on with pressure.

At a side facing away from the first piston 20, the second piston 22 delimits a second pressure chamber 27, by which a second pressure line 28 can be supplied.

Furthermore, the main cylinder unit 16 is fluidly connected to a pressure fluid reservoir 30. More specifically, a first supply line 32 leads from the pressure fluid reservoir 30 into the first pressure chamber 24 and a second supply line 34 leads from the pressure fluid reservoir 30 into the second pressure chamber 27.

The main cylinder unit 16 can be activated in known manner by actuation of a brake pedal 36.

The main cylinder unit 16 is further coupled to a simulator unit 38. This serves to provide a restoring force at the brake pedal 36.

Since such simulator units 38 and the connection thereof to a main cylinder unit 16 are known, a detailed explanation will not be given in this instance.

The brake system 10 further has an electrofluidic pressure generation unit 40.

The electrofluidic pressure generation unit 40 substantially comprises an electric drive motor 42 which is drivingly coupled to a linearly movable piston 44.

The piston 44 is guided in a cylinder 46 which, on the one hand, is supplied with pressure fluid from the pressure fluid reservoir 30 via a supply line 48 and, on the other hand, can supply pressurised pressure fluid into an output line 50.

In the exemplary arrangement illustrated, the cylinder 46 acts on the output line 50 via a first supply valve 52 and a second supply valve 54. In addition, the piston 44 is configured with an internal fluid channel 56. In a manner known per se, this configuration enables the piston 44, both in the event of a stroke in a direction orientated away from the drive motor 42 and in the event of a stroke in a direction orientated towards the drive motor 42, to supply pressurised pressure fluid into the output line 50. Such pistons are also known as dual acting plungers.

Both by operation of the main cylinder unit 16 and by operation of the electrofluidic pressure generation unit 40, a volume flow of pressure fluid which is removed from the pressure fluid reservoir 30 can thus selectively be placed under pressure.

This volume flow which has been placed under pressure is then provided at the input of a first selection valve 58 and at the input of a second selection valve 60.

In this instance, the first selection valve 58 is coupled at the output side to the pressure connections 12*c*, 12*d*. The fluid lines between the first selection valve 58 and the pressure connections 12*c*, 12*d* can in this instance be referred to as a first brake circuit.

In the same manner, the second selection valve 60 is coupled at the output side to the pressure connections 12*a*, 12*b*. The fluid lines between the second selection valve 60 and the pressure connections 12*a*, 12*b* can consequently be referred to as a second brake circuit.

The two selection valves 58, 60 may in each case assume two switching positions.

In this instance, valves 58, 60 are pretensioned into a switching position which is provided to direct by operation of the main cylinder unit 16, that is to say, via the pressure lines 26 and 28, a pressurised volume flow of pressure fluid to the associated pressure connections 12*a*, 12*b*, 12*c*, 12*d* in each case. These valve positions are illustrated in FIG. 1. In these valve positions, the electrofluidic pressure generation unit 40 is also connected to the pressure connections 12*a*, 12*b*, 12*c*, 12*d* by operation of non-return valves which are arranged inside the selection valves 58, 60 but the non-return valves serve substantially to relieve the pressure of the electrofluidic pressure generation unit 40 and the associated fluid lines. They are not intended to supply pressure to the pressure connections 12*a*, 12*b*, 12*c*, 12*d*.

The selection valves 58, 60 can also be moved into a second valve position by electrical actuation. This is provided by operation of the electrofluidic pressure generation unit 40 to provide a pressurised volume flow of pressure fluid at the pressure connections 12*a*, 12*b*, 12*c*, 12*d*. In this valve position, the main cylinder unit 16 is separated in fluid terms from the pressure connections 12*a*, 12*b*, 12*c*, 12*d*. It cooperates only with the simulator unit 38.

In terms of flow in the direction of the pressure connections 12*a*, 12*b*, 12*c*, 12*d*, the two selection valves 58, 60 are adjoined by a pressure modulation unit 62 which together with a control unit which is not illustrated in greater detail and the brake actuators 14*a*, 14*b*, 14*c*, 14*d* provides in known manner the functionality of an anti-lock braking system.

In this context, an ABS check valve 64*a* and an ABS discharge valve 66*a* are associated with the pressure connection 12*a*. The pressure connection 12*b* is in a similar manner associated with an ABS check valve 64*b* and an ABS discharge valve 66*b*. An ABS check valve 64*c* and an ABS discharge valve 66*c* are associated with the pressure connection 12*c*. An ABS check valve 64*d* and an ABS discharge valve 66*d* are associated with the pressure connection 12*d*.

Such valve connections are known per se and are therefore not explained in greater detail.

In the exemplary arrangement illustrated, the main cylinder unit 16, the electrofluidic pressure generation unit 40, the simulator unit 38, the selection valves 58, 60 and the pressure modulation unit 62 are configured as a mechanically coherent unit E. This means that the above-mentioned components are arranged in a common housing. This mechanically coherent unit E can also be referred to as a base module B.

In this context, the pressure connection 12*a* is provided directly at the pressure modulation unit 62, that is to say, directly at the base module B. The same applies to the pressure connection 12*d*.

The pressure connection 12*b* is, however, connected via an electrofluidic pressure increase unit 68*a* to the pressure modulation unit 62 and consequently the base module B.

In this instance, the pressure increase unit 68*a* is fluidly connected at the output side to the pressure connection 12*b*.

At the input side, the pressure increase unit 68*a* is fluidly coupled via the pressure modulation unit 62 and the selection valve 60, depending on the position thereof, to the electrofluidic pressure generation unit 40 and/or the main cylinder unit 16.

That is to say, the pressure modulation unit 62 is located between, on the one hand, the pressure increase unit 68*a* and, on the other hand, the electrofluidic pressure generation unit 40 and/or the main cylinder unit 16.

It can also be said that the electrofluidic pressure increase unit 68*a* is coupled at the input side to the electrofluidic pressure generation unit 40 and/or the main cylinder unit 16.

This is particularly the case from the point of view that at the pressure increase unit 68*a* a volume flow of pressure fluid which is pressurised by the electrofluidic pressure generation unit 40 and/or the main cylinder unit 16 is exclusively provided at the input side.

The pressure increase unit 68*a* is constructed to act on this volume flow of pressure fluid with a supplementary pressure.

To this end, the pressure increase unit 68*a* comprises a pressure generator 70 in the form of a single-piston pump which can be driven by an electric drive motor 72.

Following the fluid train which leads from the pressure modulation unit 62 to the pressure generator 70, the pressure increase unit 68*a* has a non-return valve 74 and a check valve 76.

The non-return valve 74 is in the exemplary arrangement illustrated as a 2/2-way valve which is configured as a control valve.

In this instance, the non-return valve 74 is pretensioned into the open position thereof. Furthermore, it is pressure-controlled at the output side, wherein the pressure control acts in the same direction as the pretensioning.

The non-return valve 74 can thus be closed electrically counter to the pressure control and counter to the pretensioning.

In a bypass path which circumvents the non-return valve 74, there is provided a non-return valve arrangement 77 which allows a flow to pass in the direction of the pressure connection 12*b* but blocks a flow in an opposing direction. Therefore, the only important feature is a position of the non-return valve 74 when it is flowed through in a direction orientated away from the pressure connection 12*b*. This is the case when the pressure connection 12*b* is intended to be depressurised.

The check valve 76 is also configured as a 2/2-way valve.

In this instance, the check valve 76 is a switching valve.

This valve is pretensioned into the closed position thereof and pressure-controlled at the input side. Again, the pressure control acts in the same direction as the pretensioning. The check valve 76 can be moved into the open position thereof by electrical actuation The functions of the non-return valve 74 and the check valve 76 are explained in greater detail below.

In addition, the pressure increase unit 68*a* comprises a pressure store 78 for pressure fluid.

In this instance, the pressure store 78 is connected by a side line 80 to the fluid path which comprises the pressure generator 70.

In addition, a bypass fluid path 82 which circumvents the pressure generator 70 is provided.

A control valve 84 is arranged in the bypass fluid path 82.

The control valve 84 is pretensioned into the open position thereof and pressure-controlled at the output side. The pressure control again acts in the same direction as the pretensioning.

Furthermore, the control valve 84 can be electrically actuated and can be actively closed by an actuation.

The control valve 84 also has a bypass path which circumvents it and in which there is provided a non-return valve arrangement 85 which allows a flow to pass in the direction of the pressure connection 12*b* but blocks a flow in the opposite direction. Therefore, the only important feature is a position of the control valve 84 when it is flowed through in a direction orientated away from the pressure connection 12*b*. This is the case when the pressure connection 12*b* is intended to be depressurised.

The pressure increase unit 68*a* functions as follows.

If the pressure generator 70 is not intended to be used, the check valve 76 is moved into the closed position thereof.

The non-return valve 74 and the control valve 84 are then in the open position thereof. The non-return valve 74 and the control valve 84 are thus not activated.

In this manner, a volume flow which is present at the input side at the pressure increase unit 68*a* can reach the pressure connection 12*b* directly.

When the pressure connection 12*b* is intended to be depressurised, pressure fluid can flow through the control valve 84 and the non-return valve 74 from the pressure connection 12*b* in the direction of the pressure fluid reservoir 30, for example, via the ABS discharge valve 66*b*.

If, by operation of the pressure generator 70, the volume flow which is provided at the input thereof is intended to be acted on with a supplementary pressure, the check valve 76 is moved into the open position thereof.

The volume flow of pressure fluid can thereby reach the pressure generator 70.

The level of the supplementary pressure may in this instance be regulated or controlled by a corresponding control of the drive motor 72. In particular, a speed of the drive motor 72 can be controlled or regulated to this end.

On the other hand, the control valve 84 and the non-return valve 74 are used to control or regulate the supplementary pressure.

In the event that the control valve 84 is in the completely closed, that is to say, activated position thereof, the volume flow discharged by the pressure generator 70 is provided in full at the pressure connection 12*b*. The full pressure applied to the pressure generator 70 is consequently applied to the pressure connection 12*b*.

Based on this situation, by moving the control valve 84, the volume flow and/or pressure provided at the pressure connection 12*b* can be reduced. The volume flow and pressure which is consequently provided at the pressure connection 12*b* can consequently be controlled in a very precise manner.

The non-return valve 74 also contributes to this control. This is because, via a corresponding actuation of the non-return valve 74, it can be determined what proportion of the volume flow flowing through the bypass fluid path 82 is supplied via the check valve 76 to the pressure generator 70 or the pressure store 78 again. The remaining portions flow back to the pressure modulation unit 62 and can be directed from there into the pressure fluid reservoir 30.

The pressure connection 12*c* is also connected to the pressure modulation unit 62 via a pressure increase unit 68*b*.

The pressure increase unit 68*b* is in this instance constructed in the same manner as the pressure increase unit 68*a* so that reference may be made to the above explanations. Mutually corresponding components are given the same reference numerals in this instance.

The drive motor 72 acts in this context as a common drive for the two pressure generators 70. The drive motor 72 can thus be associated both with the pressure increase unit 68*a* and with the pressure increase unit 68*b*.

The brake system 10 according to the first exemplary arrangement comprises a total of two electrofluidic pressure increase units 68*a*, 68*b* which are connected at the output side to one of the pressure connections 12*a*, 12*b*, 12*c*, 12*d*, respectively.

With regard to the pressure increase units 68*a*, 68*b*, the brake system 10 can according to the first exemplary arrangement consequently also be referred to as a dual-channel system.

The pressure increase units 68*a*, 68*b* are additionally configured as a mechanically coherent unit H. This means that the components of the pressure increase units 68*a*, 68*b* are arranged in a common housing or a common block. This mechanically coherent unit H may also be referred to as a supplementary module G.

Figure 2:
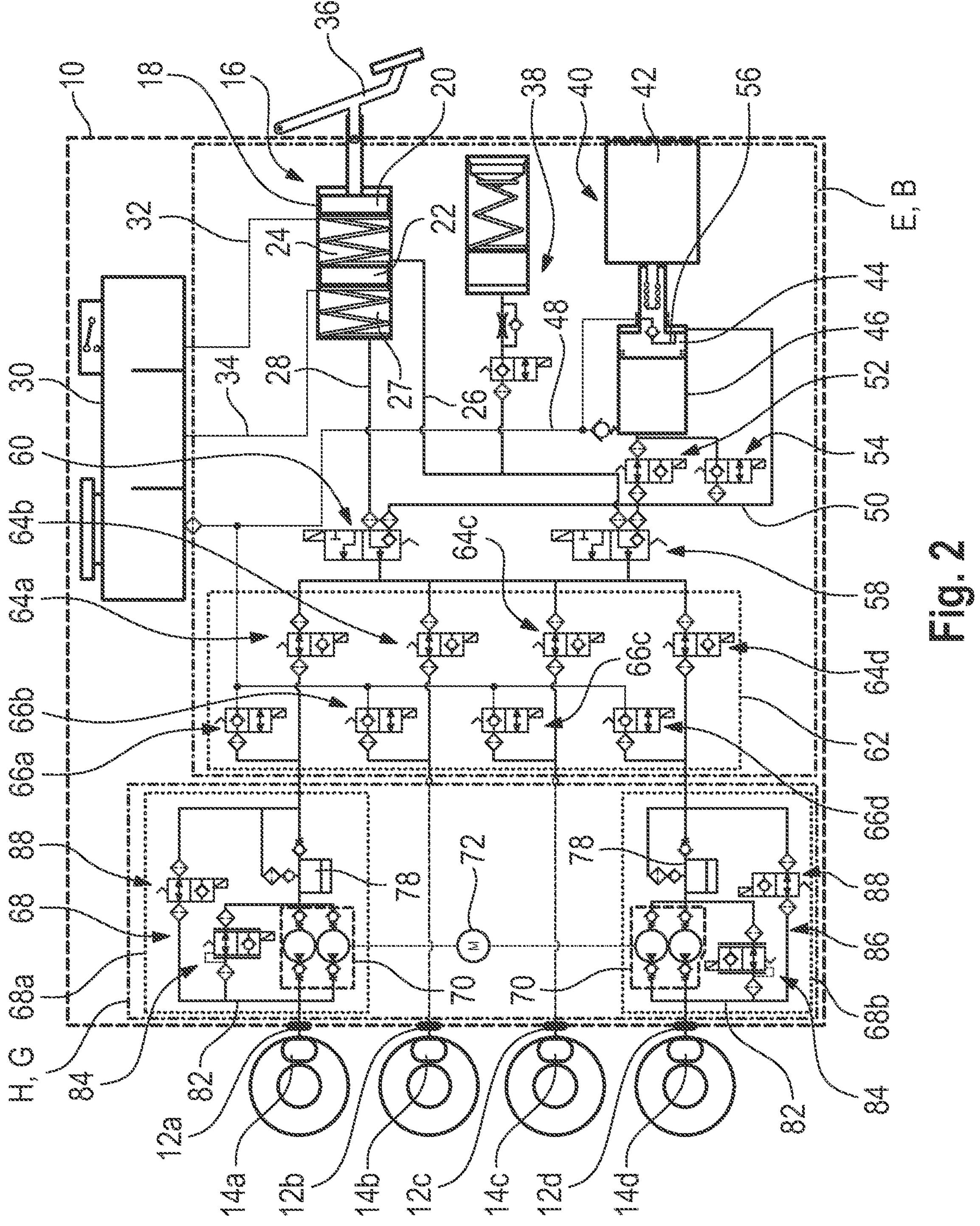
FIG. 2 shows a brake system according to the disclosure according to a second exemplary arrangement which can be operated using a method according to the disclosure.

A second exemplary arrangement of the brake system 10 is shown in FIG. 2.

In this instance, the base module B is constructed to be identical to the base module B of the first exemplary arrangement.

Only the differences with respect to the first exemplary arrangement will be discussed below. Components which correspond or are identical to each other are given the same reference numerals.

The differences between the first exemplary arrangement and the second exemplary arrangement relate to the pressure increase units 68*a*, 68*b*, of which there are also provided in the brake system 10 according to the second exemplary arrangement, two units, which are configured again as a mechanically coherent unit H and form a supplementary module G.

Furthermore, the brake actuators 14*a*, 14*b*, 14*c*, 14*d* together with the brake system 10 of the second exemplary arrangement are associated in a different manner with the wheels of the vehicle which is provided with the brake system 10.

The brake system 10 according to the second exemplary arrangement is connected to the pressure connection 12*a* of the brake actuator 14*a* again. However, this is now associated with the front right wheel of the vehicle. There is again connected to the pressure connection 12*b* the brake actuator 14*b* which is now associated with the rear left wheel. There is further connected to the pressure connection 12*c* the brake actuator 14*c* which in the second exemplary arrangement is associated with the rear right wheel. There is further connected to the pressure connection 12*d* the brake actuator 14*d* which is associated with the front left wheel.

The pressure increase unit 68*a* is thus further associated with the pressure connection 12*a* to which the brake actuator 14*d* is connected for the front right wheel.

The pressure increase unit 68*b* is further associated with the pressure connection 12*d* to which the brake actuator 14*d* for the front left wheel is connected.

On the one hand, the pressure increase units 68*a*, 68*b* differ in this instance from the pressure increase units 68*a*, 68*b* in the brake system 10 according to the first exemplary arrangement in that the pressure generators 70 are configured as dual-piston pumps.

Furthermore, the pressure stores 78 are now arranged in each case in a fluid path which surrounds the pressure generator 70. This means that pressure fluid starting from the pressure modulation unit 62 can reach the associated pressure generator 70 only via one of the pressure stores 78.

In contrast to the first exemplary arrangement, the pressure increase units 68*a*, 68*b* comprise in the second exemplary arrangement a pressure store bypass path 86 which bypasses the pressure store 78.

A switching valve 88 is arranged in the pressure store bypass path 86. In this instance, the switching valve 88 may assume a first switching position in which it is open, that is to say, allows pressure fluid to pass regardless of a flow direction. The switching valve 88 is pretensioned into this position. Furthermore, the switching valve can be activated counter to the pretensioning. In the activated position, the switching valve 88 acts as a non-return valve which allows only a flow of pressure fluid in the direction of the associated pressure connection 12*a*, 12*d* to pass and which blocks a flow in the opposite direction.

Compared with the first exemplary arrangement, the check valves are dispensed with.

The bypass fluid paths 82 and the control valves 84 which are arranged therein correspond to the first exemplary arrangement During operation of the pressure increase units 68*a*, 68*b* in the brake system 10 according to the second exemplary arrangement, therefore, as a result of the switching position of the switching valve 88 it can be determined whether pressure fluid from the associated pressure connection 12*a*, 12*d* can flow back in the direction of the pressure modulation unit 62.

In the event that, when the pressure generator 70 is used, a pressure is intended to be provided at the associated pressure connection 12*a*, 12*d*, the respective switching valves 88 are closed, that is to say, they act as non-return valves. A pressure reduction at the associated pressure connection 12*a*, 12*d* is thus not possible via the switching valve 88.

In this position of the switching valve 88, a complete pressure reduction at the associated pressure connection 12*a*, 12*b* is not possible since the pressure store 78 via which such a pressure reduction would have to take place is coupled in the direction of the pressure modulation unit 62 to a pretensioned non-return valve.

A substantially complete pressure reduction at the pressure connection 12*a*, 12*d* is only possible by opening the switching valve 88.

Since the brake system 10 according to the second exemplary arrangement has two pressure increase units 68*a*, 68*b*, it can be referred to as a dual-channel system.

Figure 3:
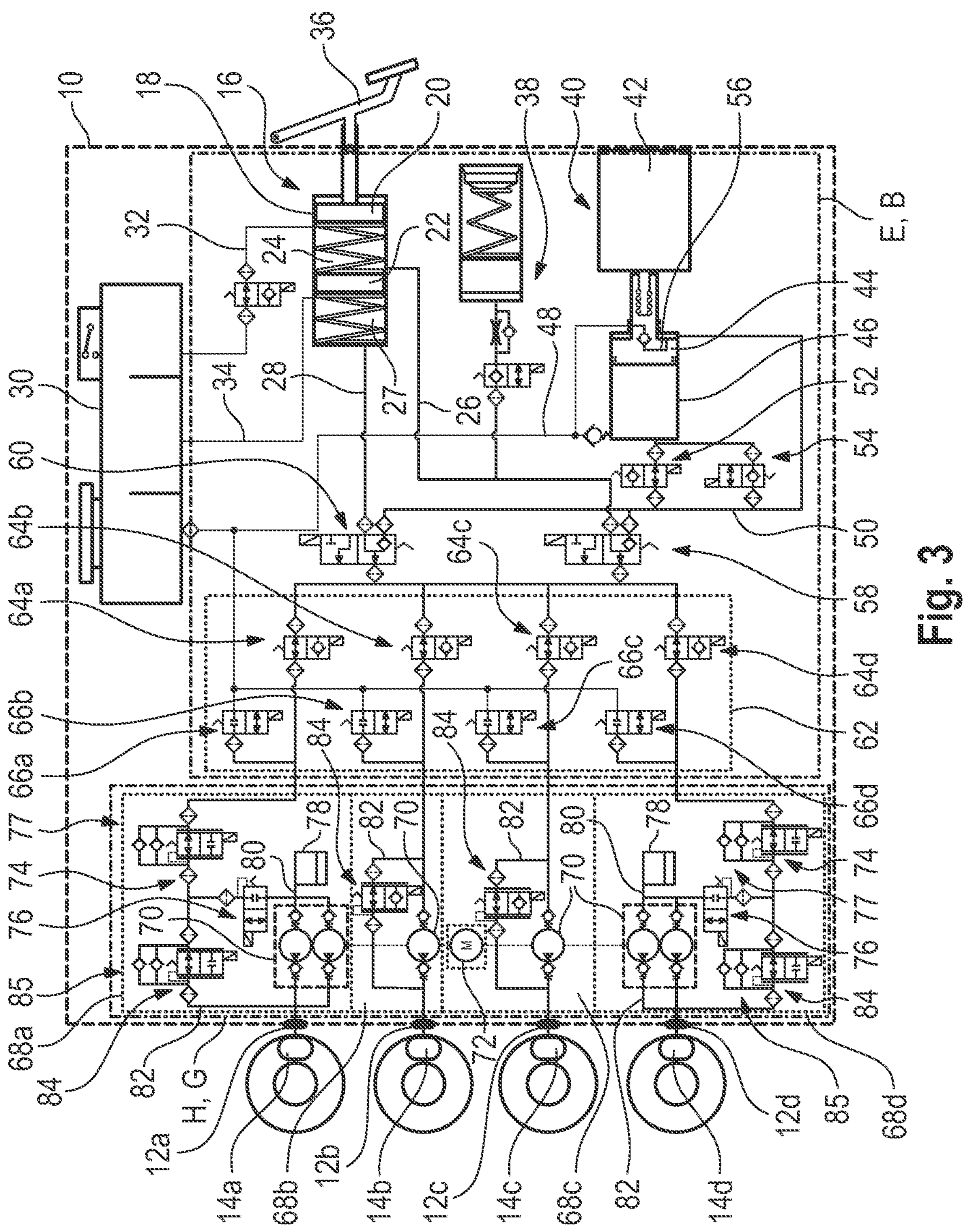
FIG. 3 shows a brake system according to the disclosure according to a third exemplary arrangement which can be operated using a method according to the disclosure.

FIG. 3 shows a third exemplary arrangement of the brake system 10.

Again in this instance, only the differences with respect to the arrangements already explained will be discussed. Components which are identical or correspond to each other are given the same reference numerals.

The third exemplary arrangement differs from the brake system 10 already described only with regard to the pressure increase units. In this context, the brake system 10 according to the third exemplary arrangement comprises a total of four pressure increase units 68*a*, 68*b*, 68*c*, 68*d*.

The brake actuators 14*a*, 14*b*, 14*c*, 14*d* are in the same manner as in the second exemplary arrangement associated with the wheels of the vehicle which is provided with the brake system 10.

In this instance, the pressure increase units 68*a* and 68*d* are constructed in a substantially identical manner to the pressure increase units 68*a* and 68*b* of the brake system 10 according to the first exemplary arrangement. The only difference is that the pressure generator 70 is now configured as a dual-piston pump.

With regard to the pressure increase units 68*a* and 68*d*, it is consequently possible to dispense with the explanations in connection with the first exemplary arrangement.

The pressure increase units 68*b* and 68*c* are constructed in an identical manner.

In this instance, these pressure increase units 68*b*, 68*c* are configured in each case without a pressure store. The pressure generator 70 is in each case constructed as a single-piston pump.

In addition, there is again provided a bypass fluid path 82 in which a control valve 84 is arranged.

The control valves 84 function in the same manner as the control valves 84 described above.

In contrast to the pressure increase units described above, however, the control valves 84 constitute in the pressure increase units 68*b* and 68*c* from the brake system 10 according to the third exemplary arrangement the only valves.

The pressure increase units 68*b* and 68*c* are consequently constructed in a structurally particularly simple manner.

In the brake system 10 according to the third exemplary arrangement, the drive motor 72 is associated with all the pressure increase units 68*a*, 68*b*, 68*c*, 68*d* and thus drives all the pressure generators 70.

Since, in the brake system according to the third exemplary arrangement, a total of four pressure increase units 68*a*, 68*b*, 68*c*, 68*d* are provided, this brake system 10 can also be referred to with respect to the pressure increase units 68*a*, 68*b*, 68*c*, 68*d* as a four-channel system.

The brake systems 10 according to the first, second and third exemplary arrangements can all be operated by a method for operating a brake system 10.

In this instance, during normal operation of the brake system 10, all the components are functional and defect-free.

In this context, the main cylinder unit 16 is used only to detect a brake request of a driver of the vehicle which is provided with the brake system 10.

The volume flow of pressure fluid taken from the pressure fluid reservoir 30 is pressurised by operation of the electro-fluidic pressure generation unit 40.

The selection valves 58, 60 are accordingly in the connected state thereof, in which the pressure generation unit 40 is exclusively connected to the pressure modulation unit 62.

As a result of the missing fluid coupling between the main cylinder unit 16 and the pressure connections 12*a*, 12*b*, 12*c*, 12*d*, such a normal operation is also referred to as a brake-by-wire operation.

Within this normal operation, the brake system 10 can operate in a low-load mode, in which the volume flow of pressure fluid is pressurised exclusively by operation of the electrofluidic pressure generation unit 40.

The pressure generators 70 of the pressure increase units 68*a*, 68*b*, 68*c*, 68*d* are thus not used.

Accordingly, the control valves 84 of the bypass fluid paths 82 are open.

In the brake systems 10 according to the first and third exemplary arrangements, the non-return valves 74 are further also open.

In the brake system 10 according to the second exemplary arrangement, the switching valve 88 may alternatively or additionally be in the open position thereof.

In the event that a pressure which exceeds a predetermined limit pressure is requested by the brake system 10 at the pressure connections 12*a*, 12*b*, 12*c*, 12*d*, the brake system 10 can also be operated in a high-load mode within normal operation.

Starting from the above-described low-load mode, the pressure increase units 68*a*, 68*b*, 68*c*, 68*d* are now connected in such a manner that the volume flow of pressure fluid which is brought to a first pressure level by operation of the electrofluidic pressure generation unit 40 is applied at the input side to the respective pressure generator 70.

By operation of the pressure generators 70, more generally speaking by operation of the electrofluidic pressure increase units 68*a*, 68*b*, 68*c*, 68*d*, this volume flow is brought to a second, higher pressure level than is then provided at the pressure connections 12*a*, 12*b*, 12*c*, 12*d* which are coupled to one of the pressure increase units 68*a*, 68*b*, 68*c*, 68*d*.

Since the pressure increase units 68*a*, 68*b*, 68*c*, 68*d*, at least at the pressure connections 12*a*, 12*b*, 12*c*, 12*d* to which they are coupled, increase a provided pressure of the pressure fluid, this operating mode can also be referred to as a boost mode.

Of course, in a brake system 10 which comprises more than one pressure increase unit 68*a*, 68*b*, 68*c*, 68*d*, each of the pressure increase units 68*a*, 68*b*, 68*c*, 68*d* can be individually controlled.

In this context, different pressures may be requested at different brake actuators 14*a*, 14*b*, 14*c*, 14*d* so that the pressure increase units 68*a*, 68*b*, 68*c*, 68*d* do not necessarily all have to be operated in low-load mode or in high-load mode. Mixed modes are also possible.

It may also be the case that a malfunction occurs in the brake system 10.

For example, in a first malfunction mode the electrofluidic pressure generation unit 40 is operational.

The selection valves 58, 60 are then connected in such a manner that a pressurised volume flow of pressure fluid produced by the main cylinder unit 16 can be introduced into the pressure modulation unit 62.

The first malfunction mode can therefore also be referred to as a pressure generation unit failure mode.

A low-load mode is also provided in connection with the first malfunction mode.

In this context, as described above, the pressure generators 70 of the pressure increase units 68*a*, 68*b*, 68*c*, 68*d* are not used. The pressure provided at the pressure connections 12*a*, 12*b*, 12*c*, 12*d* is thus produced exclusively by the main cylinder unit 16.

In the event that a pressure requested by the brake system 10 at the pressure connections 12*a*, 12*b*, 12*c*, 12*d* exceeds a predetermined limit pressure, the brake system 10 can also be operated within the first malfunction mode in a high-load mode. This substantially corresponds to the high-load mode explained above so that reference may be made thereto. In high-load mode, however, the main cylinder unit 16 and the pressure increase units 68*a*, 68*b*, 68*c*, 68*d* now cooperate.

The brake system 10 can also be used in a vehicle, which is used in an autonomous or partially autonomous operating mode which is characterised in that an intervention of a driver for braking is not intended. In other words, an activation of the main cylinder unit 16 is not provided by the driver.

In this context, the electrofluidic pressure generation unit 40 may also be operational.

Such an operating situation of the brake system 10 is referred to as a second malfunction mode or autonomous pressure generation unit failure mode.

In this context, therefore, the volume flow of pressure fluid from the pressure fluid reservoir 30 is pressurised neither by the electrofluidic pressure generation unit 40 nor by the main cylinder unit 16.

The pressure fluid provided at the pressure connections 12*a*, 12*b*, 12*c*, 12*d* is consequently pressurised exclusively by the pressure generators 70 of the pressure increase units 68*a*, 68*b*, 68*c*, 68*d*.

Since, in the second malfunction mode, exclusively the pressure increase units 68*a*, 68*b*, 68*c*, 68*d* are available for activating the brake actuators 14*a*, 14*b*, 14*c*, 14*d*, the brake system 10 according to the third exemplary arrangement is particularly highly suitable if such an operating situation is involved.

The brake system 10 according to the third exemplary arrangement is thus particularly highly suitable for vehicles which can be used in an autonomous or partially autonomous operating mode.

The brake system 10 can also be operated in a third malfunction mode.

In the third malfunction mode, the electrofluidic pressure generation unit 40 is operational again. At the same time, in the main cylinder unit there is a malfunction which leads to the main cylinder unit 16 only being able to place the pressure fluid under a pressure which is not sufficient to activate the brake actuators 14*a*, 14*b*, 14*c*, 14*d*.

In the third malfunction mode, therefore, the volume flow of pressure fluid from the pressure fluid reservoir 30 is thus brought by means of the main cylinder unit 16 to a first pressure level which as mentioned is not sufficient to activate the brake actuators 14*a*, 14*b*, 14*c*, 14*d*. By operation of the electrofluidic pressure increase units 68*a*, 68*b*, 68*c*, 68*d*, the pressure is brought from the first pressure level to a second higher pressure level.

The third operating mode thus corresponds to the first operating mode with the difference that there is no longer any distinction between low-load mode and high-load mode.

The third malfunction mode can also be referred to as a pressure generation unit failure and main cylinder unit malfunction mode.

In the event that the brake system 10 is used again in a vehicle which is operated in an autonomous or partially autonomous operating mode, the electrofluid pressure generation unit 40 may have a malfunction which results in a pressure being able to be provided by the pressure generation unit 40 but being too low to activate the brake actuators 14*a*, 14*b*, 14*c*, 14*d*.

As a result of the autonomous or partially autonomous operation of the vehicle, the main cylinder unit 16 is not available for providing a pressure.

In the fourth operating mode, therefore, the pressure fluid from the pressure fluid reservoir 30 is brought by operation of the electrofluidic pressure generation unit 40 to a first, inadequate pressure level. By operation of the electrofluidic pressure increase units 68*a*, 68*b*, 68*c*, 68*c*, the pressure fluid is brought from the first pressure level to a second higher pressure level.

In the fourth malfunction mode, there is therefore also no distinction between a low-load mode and a high-load mode.

The fourth malfunction mode can also be referred to as an autonomous pressure generation unit malfunction mode.

In these operating situations in which a low-load mode and a high-load mode are provided, the question arises as to when to move from the low-load mode into the high-load mode and vice versa.

In this context, the brake system 10 is operated in a low-load mode when a pressure which is intended to be provided is below a limit pressure. The brake system is operated in high-load mode when the pressure which is intended to be provided corresponds to or exceeds the limit pressure.

In this instance, in a first variant, the limit pressure corresponds to a maximum pressure which can be provided by operation of the electrofluidic pressure generation unit 40. The pressure increase units 68*a*, 68*b*, 68*c*, 68*d* are thus only used when sufficient pressure cannot be provided by operation of the electrofluidic pressure generation unit 40 and/or the main cylinder unit 16.

In a second exemplary arrangement, the limit pressure is defined below the maxim pressure which can be provided by the electrofluidic pressure generation unit 40. The pressure increase units 68*a*, 68*b*, 68*c*, 68*d* are consequently also used in situations in which the power limit of the electrofluidic pressure generation unit 40 has not yet been reached.

The operation of the brake systems 10 according to the first, second and third exemplary arrangements have been explained together above. In this instance, it may be understood that only the pressure increase units 68*a*, 68*b*, 68*c*, 68*d* which are provided in the corresponding exemplary arrangements can always be intended.

Of course, it is also conceivable with regard to the pressure increase units 68*a*, 68*b*, 68*c*, 68*d* to form mixed forms. As will become clear from the above explanations, the various types of pressure increase units 68*a*, 68*b*, 68*c*, 68*d* are mutually interchangeable. Fewer or more channels than in the above exemplary arrangements can also be provided with a pressure increase unit 68*a*, 68*b*, 68*c*, 68*d*.

The invention claimed is:

1. A brake system for a vehicle, wherein the brake system is constructed for selective pressurisation and pressure relief of at least two pressure connections for brake actuators and each of the pressure connections can be coupled to an associated brake actuator of a wheel of the vehicle, comprising:

an electrofluidic pressure generation unit that is fluidly coupled to a pressure fluid reservoir so that a volume flow of pressure fluid from the pressure fluid reservoir can be selectively pressurised and provided at the pressure connections, a main cylinder unit which comprises a fluidic brake main cylinder configured to be activated by a brake pedal, the main cylinder unit being fluidly connected to the pressure fluid reservoir so that a volume flow of pressure fluid from the pressure fluid reservoir can be selectively pressurised and provided at the pressure connections, a coherent structural block in which the electrofluid pressure generation unit and the main cylinder unit are jointly arranged, the coherent structural block comprising internal fluid channels through which pressure fluid flows;

an electrofluidic pressure increase unit configured as a supplementary module separate from the coherent structural block, the pressure increase unit being fluidly coupled at an input side to the electrofluidic pressure generation unit and/or the main cylinder unit such that exclusively a volume flow of pressure fluid pressurised by the electrofluidic pressure generation unit and/or the main cylinder unit is acted on with a supplemantry pressure by the pressure increase unit wherein the pressure increase unit comprises a pressure generator and a pressure store, the pressure store being connected to a fluid path that surrounds the pressure generator by a side line, wherein the pressure increase unit further comprises a bypass fluid path that circumvents the pressure generator, and a control valve arranged in the bypass fluid path, the control valve being pretensioned into an open position and pressure-controlled at the output side; and wherein the pressure increase unit is fluidly connected at an output side to one of the pressure connections.

2. The brake system according to claim 1, wherein the pretensioning acts in a same direction as a pressure control from the pressure increase unit.

3. The brake system according to claim 1, wherein the control valve can be electrically activated in an opposite direction to a pressure control from the pressure increase unit.

4. The brake system according to claim 1, wherein the pressure increase unit has a pressure store bypass path which circumvents the pressure store.

5. The brake system according to claim 1, wherein the main cylinder unit and the electrofluidic pressure generation unit act selectively on the pressure connections via at least one selection valve, wherein the selection valve is pretensioned into a switching position in which the main cylinder unit is fluidly coupled to the pressure connections.

6. The brake system according to claim 5, wherein a pressure modulation unit is positioned-between, on the one hand, the pressure increase unit and, on the other hand, the pressure generation unit and/or the main cylinder unit.

7. The brake system according to claim 5, wherein the pressure increase unit is fluidly coupled via the selection valve to the pressure generation unit and/or the main cylinder unit.

8. The brake system according to claim 1, wherein a pressure modulation unit is positioned between, on the one hand, the pressure increase unit and, on the other hand, the pressure generation unit and/or the main cylinder unit and at least one selection valve is positioned between the pressure modulation unit and the pressure generation unit and/or the main cylinder unit.

9. The brake system according to claim 1, wherein there are provided two or more electrofluidic pressure increase units which are fluidly connected in each case at the output side to one of the pressure connections.

10. The brake system according to claim 1, wherein the electromotively driven pressure generator is one of a single-piston pump or a multi-piston pump.

11. A method for operating a brake system comprising:

during normal operation of a brake system in a low-load mode, pressurizing a volume flow of pressure fluid from a pressure fluid reservoir exclusively by an electrofluidic pressure generation unit, and, during normal operation of the brake system in a high-load mode, bringing a volume flow of pressure fluid from the pressure fluid reservoir by the electrofluidic pressure generation unit to a first pressure level and operating an electrofluidic pressure increase unit to increase pressure fluid from the first pressure level to a second, higher pressure level, and, in a first malfunction mode of the brake system in a low-load mode, pressurizing the volume flow of pressure fluid from the pressure fluid reservoir exclusively by a main cylinder unit, and, in the first malfunction mode of the brake system in a high-load mode, bringing a volume flow of pressure fluid from the pressure fluid reservoir by operation of the main cylinder unit to a first pressure level and bringing by operation of the electrofluidic pressure increase unit from the first pressure level to a second, higher pressure level, and, in a second malfunction mode of the brake system, pressurizing a volume flow of pressure fluid from the pressure fluid reservoir exclusively by operation of the electrofluidic pressure increase unit, and, in a third malfunction mode of the brake system, bringing a volume flow of pressure fluid from the pressure fluid reservoir by operation of the main cylinder unit to a first pressure level and bringing by operation of the electrofluidic pressure increase unit from the first pressure level to a second, higher pressure level, and, in a fourth malfunction mode of the brake system, bringing a volume flow of pressure fluid from the pressure fluid reservoir by operation of the electrofluidic pressure generation unit to a first pressure level and bringing by operation of the electrofluidic pressure increase unit from the first pressure level to a second, higher pressure level, wherein the electrofluidic pressure generation unit and the main cylinder unit are configured as a coherent structural block, and the pressure increase unit is configured as a separate supplementary module that is not a component of the coherent structural block, wherein the pressure increase unit comprises a bypass fluid path that circumvents a pressure generator, wherein a control valve which is pressured-controlled at the output side is arranged in the bypass fluid path.

12. The method according to claim 11, wherein the brake system is operated in a low-load mode when a pressure which is intended to be provided by the brake system is below a limit pressure.

13. The method according to claim 11, wherein the brake system is operated in a high load mode when the pressure which is intended to be provided corresponds or exceeds a limit pressure that is provided from one of electrofluidic pressure generation unit or the main cylinder unit.

14. The method according to claim 13, wherein the brake system is operated in a high load mode when the pressure which is intended to be provided corresponds to a maximum pressure that is provided from one of electrofluidic pressure generation unit or the main cylinder unit.

* * * * *